(12) United States Patent
Kauth et al.

(10) Patent No.: US 7,705,107 B2
(45) Date of Patent: Apr. 27, 2010

(54) PROCESS FOR THE PREPARATION OF POLYCARBONATES

(75) Inventors: Hermann Kauth, Krefeld (DE);
Wolfgang Ebert, Krefeld (DE);
Wilfried Haese, Odenthal (DE); Helmut Einberger, Odenthal (DE); Alexander Meyer, Düsseldorf (DE); Andreas Frankenau, Kempen (DE); Uli Franz, Erkrath (DE); Christian Eh, Chonburi (TH); Stefaan De Vos, Rayong (TH); Bert Ruytinx, Halen (BE)

(73) Assignee: Bayer MaterialScience AG, Leverkusen (DE)

( * ) Notice: Subject to any disclaimer, the term of this patent is extended or adjusted under 35 U.S.C. 154(b) by 645 days.

(21) Appl. No.: 11/312,886

(22) Filed: Dec. 20, 2005

(65) Prior Publication Data

US 2006/0155098 A1 Jul. 13, 2006

(30) Foreign Application Priority Data

Dec. 22, 2004 (DE) .................. 10 2004 061 715

(51) Int. Cl.
*C08G 64/00* (2006.01)
*C08G 63/02* (2006.01)

(52) U.S. Cl. .............. 528/198; 264/176.1; 264/219; 428/412; 524/121; 524/445; 524/451; 524/456; 526/62; 526/63; 528/196

(58) Field of Classification Search ........... 264/176.1, 264/219; 428/412; 524/121, 445, 451, 456; 528/196, 198; 526/62, 63
See application file for complete search history.

(56) References Cited

U.S. PATENT DOCUMENTS

| 4,737,573 | A | 4/1988 | Silva et al. ............... 528/371 |
| 5,102,696 | A * | 4/1992 | Pan et al. ................. 427/222 |
| 5,235,026 | A | 8/1993 | Wulff et al. ............... 528/196 |
| 5,376,741 | A | 12/1994 | Herrig et al. ............... 526/64 |
| 6,548,691 | B2 | 4/2003 | Alewelt et al. ............. 558/274 |
| 6,613,868 | B2 * | 9/2003 | Kauth et al. ............... 528/196 |
| 2002/0077446 | A1 | 6/2002 | Alewelt et al. ............. 528/199 |
| 2002/0151672 | A1 * | 10/2002 | Kauth et al. ............... 528/196 |
| 2004/0162439 | A1 | 8/2004 | Andou et al. .............. 558/268 |

* cited by examiner

*Primary Examiner*—Terressa M Boykin
(74) *Attorney, Agent, or Firm*—Connolly Bove Lodge & Hutz LLP

(57) ABSTRACT

An improvement to the phase interface process of preparing aromatic polycarbonate is disclosed. The process is characterized in that the phosgenation is carried out at 0 to 40° C., and in that the temperature of the reaction mixture at the time of addition of the catalyst at 10 to 40° C., and in that the molar ratio of aromatic dihydroxy compounds to phosgene at 1:1.05 to 1:1.20. The polycarbonate thus produced is characterized in its low content of carbamates, making it particularly suitable for the preparation of optical storage media.

4 Claims, No Drawings

PROCESS FOR THE PREPARATION OF POLYCARBONATES

FIELD OF THE INVENTION

The invention concerns a process for the preparation of polycarbonates by the phase interface process and in particular to a process for making polycarbonates having a low content of carbamate compounds after hydrolysis.

BACKGROUND OF THE INVENTION

The phase interface process is generally known from the literature and is described, for example, in EP-A 517 044.

The polycarbonates prepared in this way have a more or less high content of carbamate compounds, which leads to a defective structure and therefore to a loss in the quality of the carrier material for optical storage media, such as CD, DVD or the like.

Calibration is carried out by an external standard method (multiple point calibration).

The object was therefore to develop a process, preferably a continuous process, for the preparation of polycarbonates which leads to polycarbonates having a low content of carbamate compounds and therefore to a significantly increased yield of high-quality optical storage disks.

Polycarbonates which contain a relatively high content of carbamate compounds after hydrolysis of the carbonate groups are a disadvantage for the production of optical storage media, in particular writable optical storage media, since the yield falls as a consequence of non-uniform application of the information-carrying layer, usually dyestuffs. It was furthermore found that audio-CDs and DVDs disks stick together in the course of production usually even before the coating.

SUMMARY OF THE INVENTION

An improvement to the phase interface process of preparing aromatic polycarbonate is disclosed. The process is characterized in that the phosgenation is carried out at 0 to 40° C., and in that the temperature of the reaction mixture at the time of addition of the catalyst at 10 to 40° C., and in that the molar ratio of aromatic dihydroxy compounds to phosgene at 1:1.05 to 1:1.20. The polycarbonate thus produced is characterized in its low content of carbamates, making it particularly suitable for the preparation of optical storage media.

DETAILED DESCRIPTION OF THE INVENTION

The object is achieved in that a process, preferably a continuous process, for the preparation of polycarbonates has been developed which renders it possible to prepare polycarbonates having a low content of the compounds described below.

The present invention therefore provides a process for the preparation of polycarbonates that contain 0.25 to 180 ppm, preferably 2.4 to 120 ppm, of compounds conforming to formula (1)

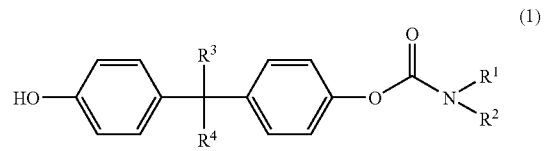

wherein
$R^1$ and $R^2$ independently of one another denote hydrogen or $C_1$-$C_{12}$-alkyl, preferably methyl, ethyl, propyl, isopropyl or butyl, or
together denote $C_4$-$C_{12}$-alkylidene, preferably $C_4$-$C_8$-alkylidene, particularly preferably $C_4$-$C_5$-alkylidene,
$R^3$ and $R^4$ independently of one another represent hydrogen, $C_1$-$C_{12}$-alkyl, preferably $C_1$-$C_8$-alkyl, or phenyl, or $R^3$ and $R^4$, with the carbon atom to which they are bonded, form cyclohexyl or trimethylcyclohexyl, characterized in that in the phosgenation step the temperature is 0 to 40° C., and the temperature of the reaction mixture at the time of addition of the catalyst is 10 to 40° C., the catalyst is present in solution and the ratio of the moles of bisphenol to moles of phosgene is 1:1.05 to 1:1.20. The measurement of the content of the carbamates is carried out after hydrolysis of the polycarbonate.

The measurement of the content of the compounds according to formula (1) in the polycarbonate after alkaline hydrolysis is carried out as follows:

1.91 g 32% strength sodium hydroxide solution and 5 g water are added to 500 mg polycarbonate in 20 g tetrahydrofuran (THF) and hydrolysis is carried out overnight (for at least 15 hours), while shaking. After the hydrolysis, the solution is acidified with hydrochloric acid and topped up to 50 ml with THF. 15 µl are injected into a high pressure liquid chromatography (HPLC) system. Detection is by DAD (diode array detector), FLD (fluorescence detector) or MS (mass spectrometry) as desired.

According to the phase interface process, which has been widely described in the literature, the phosgenation of a disodium salt of a bisphenol (or of a mixture of various bisphenols) which has been initially introduced into an aqueous-alkaline solution (or suspension) is carried out in the presence of an inert organic solvent or solvent mixture which forms a second phase. The oligocarbonates formed, which are chiefly present in the organic phase, are subjected to further condensation with the aid of suitable catalysts to give high molecular weight polycarbonates dissolved in the organic phase. Finally, the organic phase is separated off and the polycarbonate is isolated therefrom by various working up steps.

In the process according to the invention, an aqueous phase of NaOH, one or more bisphenols and water is used, it being possible for the concentration of this aqueous solution in respect of the sum of the bisphenols, calculated not as the sodium salt but as free bisphenol, to vary between 10 to 25 wt. % for polycarbonates, preferably 12 to 20 wt. % at an weight average molecular weight (Mw) of <45,000 of the polycarbonate formed. At higher concentrations it may be necessary to heat the solutions. The sodium hydroxide used for the solution of the bisphenols may be used in solid form or as aqueous sodium hydroxide solution. The concentration of the sodium hydroxide solution depends on the target concentration of the bisphenolate solution required, but is generally between 3 and 45 wt. %, preferably 5 and 35 wt. %. In the process with subsequent dilution, sodium hydroxide solutions having concentrations of 15 to 75 wt. %, preferably 25 to 55 wt. %, optionally heated, are used. The alkali content per mol of bisphenol depends on the structure of the bisphenol, but as a rule ranges between 0.25 and 5.00 mol alkali/mol bisphenol, preferably 1.5 to 2.5 mol alkali/mol bisphenol, and in the case where bisphenol A is used as the sole bisphenol, 1.85 to 2.15 mol alkali. If more than one bisphenol is used, these may be dissolved together. However, it may be advantageous to dissolve the bisphenols separately in the optimum alkaline phase and to meter the solutions separately or to feed them to the reaction together. It may furthermore be of advantage to dissolve the bisphenol or bisphenols not in sodium hydroxide solution but in dilute bisphenolate solution provided with additional alkali. The dissolving operations may start from solid bisphenol, usually in flakes or prill form, or also from molten bisphenol. The sodium hydroxide employed or the sodium hydroxide solution may have been prepared by the amalgam process or the so-called membrane process. Both processes have been used for a long time and are familiar to the person skilled in the art. Preferably, sodium hydroxide solution from the membrane process is used.

The aqueous phase prepared in this way is phosgenated together with an organic phase comprising solvents for polycarbonate which are inert towards the reactants and form a second phase.

The metering of bisphenol which is practiced, where appropriate, after or during the introduction of phosgene may be carried out for as long as phosgene is present in the reaction solution, or immediate secondary products thereof, the chlorocarbonic acid esters.

The preparation according to the invention of polycarbonates from bisphenols and phosgene in an alkaline medium is an exothermic reaction and is carried out in a temperature range of from 0° C. to 40° C., preferably 5° C. to 36° C., optionally under increased pressure, depending on the solvent or solvent mixture.

Dihydroxyaryl compounds which are suitable for the preparation of polycarbonates are those of the formula (3)

$$\text{HO—Z—OH} \quad (3)$$

in which

Z is an aromatic radical having 6 to 30 C atoms, which may contain one or more aromatic nuclei, may be substituted and may contain aliphatic or cycloaliphatic radicals or alkylaryls or heteroatoms as bridge members.

Preferably, Z in formula (3) represents a radical of the formula (4)

in which $R^6$ and $R^7$ independently of one another represent H, $C_1$-$C_{18}$-alkyl, $C_1$-$C_{18}$-alkoxy, halogen, such as Cl or Br, or in each case optionally substituted aryl or aralkyl, preferably H or $C_1$-$C_{12}$-alkyl, particularly preferably H or $C_1$-$C_8$-alkyl and very particularly preferably H or methyl, and X represents a single bond, —$SO_2$—, —CO—, —O—, —S—, $C_1$- to $C_6$-alkylene, $C_2$- to $C_5$-alkylidene or $C_5$- to $C_6$-cycloalkylidene, which may be substituted by $C_1$- to $C_6$-alkyl, preferably methyl or ethyl, and furthermore $C_6$- to $C_{12}$-arylene, which may optionally be fused with further aromatic rings containing heteroatoms.

Preferably, X represents a single bond, $C_1$ to $C_5$-alkylene, $C_2$ to $C_5$-alkylidene, $C_5$ to $C_6$-cycloalkylidene, —O—, —SO—, —CO—, —S—, —$SO_2$— or a radical of the formula (4a) or (4b)

wherein $R^8$ and $R^9$ individually selected for each $X^1$ and independently of one another denote hydrogen or $C_1$ to $C_6$-alkyl, preferably hydrogen, methyl or ethyl and $X^1$ denotes carbon and n denotes an integer from 4 to 7, preferably 4 or 5, with the proviso that on at least one atom $X^1$ $R^8$ and $R^9$ are simultaneously alkyl.

Examples of dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl) ethers, bis-(hydroxyphenyl) ketones, bis-(hydroxyphenyl) sulfides, bis-(hydroxyphenyl) sulfones, bis-(hydroxyphenyl) sulfoxides, 1,1'-bis-(hydroxyphenyl)-diisopropylbenzenes and nucleus-alkylated and nucleus-halogenated compounds thereof.

Aromatic dihydroxy compounds suitable for the preparation of the polycarbonates include hydroquinone, resorcinol, dihydroxydiphenyl, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl) sulfones, bis-(hydroxyphenyl) sulfoxides, α,α'-bis-(hydroxyphenyl)-diisopropylbenzenes and alkylated, nucleus-alkylated and nucleus-halogenated compounds thereof.

Preferred diphenols are 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxy-phenyl)-propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene, 1,1-bis-(4-hydroxyphenyl)-cyclohexane and 1,1-bis-(4-hydroxyphenyl)-3,3,5-trimethylcyclohexane (bisphenol TMC).

Particularly preferred diphenols are 4,4'-dihydroxydiphenyl, 1,1-bis-(4-hydroxyphenyl)-phenyl-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

These and further suitable diphenols are described e.g. in U.S. Pat. Nos. 2,999,835, 3,148,172, 2,991,273, 3,271,367, 4,982,014 and 2,999,846, in the German Offenlegungsschriften 1 570 703, 2 063 050, 2 036 052, 2 211 956 and 3 832 396, French Patent Specification 1 561 518, in the monograph "H. Schnell, Chemistry and Physics of Polycarbonates, Interscience Publishers, New York 1964, p. 28 et seq.; p. 120 et seq." and in "D. G. Legrand, J. T. Bendler, Handbook of Polycarbonate Science and Technology, Marcel Dekker New York 2000, p. 72 et seq.".

In the case of homopolycarbonates, only one diphenol is employed, and in the case of copolycarbonates several diphenols are employed, it being possible for the bisphenols used, like all the other chemicals and auxiliary substances added to the synthesis, to be contaminated with the impurities originating from their own synthesis, handling and storage, although it is desirable to use raw materials which are as pure as possible.

The organic phase may comprise one or mixtures of several solvents. Suitable solvents are chlorinated hydrocarbons (aliphatic and/or aromatic), such as methylene chloride, trichloroethylene, 1,1,1-trichloroethane, 1,1,2-trichloroethane and chlorobenzene, preferably methylene chloride and chlorobenzene and mixtures thereof.

The two phases which form the reaction mixture are mixed in order to accelerate the reaction. This is effected by introducing energy via shearing devices, i.e. pumps or stirrers, or by static mixers or by generating turbulent flow by means of nozzles and/or diaphragms. Combinations of these measures are also used, often also repeatedly in a sequence of time or apparatuses. Stirrers which are preferably employed are anchor, propeller or MIG stirrers etc. such as are described e.g. in Ullmann, "Encyclopedia of Industrial Chemistry", 5th edition, vol. B2, p. 251 et seq. Pumps which are employed are centrifugal pumps, often also multi-stage pumps, 2- to 9-stage pumps being preferred. Nozzles and/or diaphragms which are employed are perforated diaphragms or in place of these pieces of constricted pipe, or also Venturi or Lefos nozzles.

The phosgene may be introduced in gaseous or liquid form or as a solution in a solvent. While the excess of phosgene, based on the sum of the bisphenols employed, used in the conventional polycarbonate synthesis is between 3 and 100 mol %, preferably between 5 and 50 mol %, the process according to the invention is characterized by phosgene excesses of from 5 to 20 mol %, preferably 8 to 17 mol %. Via subsequent metering of sodium hydroxide solution once or several times or appropriate subsequent metering of bisphenolate solution, the pH of the aqueous phase is kept in the alkaline range, preferably between 8.5 and 12, during and after the phosgene metering, while after the addition of catalyst it should be 10 to 14.

The temperature during the phosgenation is conventionally 25 to 85° C., preferably 35 to 85° C., but in the process according to the invention 0° C. to 40° C., preferably 5° C. to 36° C.

The phosgene may be metered directly into the mixture of organic and aqueous phase described, or also completely or partly into one of the two phases, before mixing of the phases, which is then mixed with the other corresponding phase. The phosgene may furthermore be metered completely or partly into a recycled part stream of the synthesis mixture of the two phases, this part stream preferably being recycled before the addition of the catalyst. In another embodiment, the aqueous phase described is mixed with the organic phase containing the phosgene and, after a dwell time of 1 second to 5 min, preferably 3 seconds to 2 minutes, added to the abovementioned recycled part stream, or the two phases, the aqueous phase described with the organic phase containing the phosgene, are mixed directly in the abovementioned recycled part stream. In all these embodiments the pH ranges described above are to be noted and, where appropriate, are to be adhered to by subsequent metering of sodium hydroxide solution once or several times or appropriate subsequent metering of bisphenolate solution. Likewise, the temperature range must be adhered to, if appropriate by cooling or dilution.

The polycarbonate synthesis may be carried out continuously or discontinuously. The reaction may therefore be carried out in stirred tanks, tube reactors, circulating pump reactors or cascades of stirred tanks, optionally using meterings through nozzles or combinations thereof, where it is to be ensured, by using the mixing organs already mentioned, that the aqueous and organic phase as far as possible only demix when the synthesis mixture has reacted completely, i.e. no longer contains hydrolysable chlorine from phosgene or chlorocarbonic acid esters. The after-reaction of the reaction mixture may then be carried out in stirred tanks and/or tube reactors, optionally connected in parallel. A continuous reaction is preferred, in particular one which uses a circulating pump reactor as the phosgenation reactor and tube reactors downstream.

The monofunctional chain terminators for regulating the molecular weight, such as phenol or alkylphenols, in particular phenol, p-tert-butylphenol, iso-octylphenol, cumylphenol or chlorocarbonic acid esters thereof, or acid chlorides of monocarboxylic acids or mixtures of these chain terminators, either are fed with the bisphenolate or the bisphenolates to the reaction or are added to the synthesis at any desired point in time as long as phosgene or chlorocarbonic acid end groups are still present in the reaction mixture or, in the case of the acid chlorides and chlorocarbonic acid esters as chain terminators, as long as sufficient phenolic end groups of the polymer forming are available. Preferably, however, the chain terminator or terminators are added after the phosgenation, at a place or at a point in time where phosgene is no longer present but the catalyst has not yet been metered, the metering being carried out in bulk, optionally as a melt, or as a 1 to 50 wt. % strength solution, preferably 5 to 20 wt. % strength solution.

In the same manner, any branching agents or branching agent mixtures to be used are added to the synthesis, but conventionally before the chain terminators. Trisphenols, quaternary phenols or acid chlorides of tri- or tetracarboxylic acids are conventionally used, or also mixtures of the polyphenols or of the acid chlorides.

Some of the compounds having three or more phenolic hydroxyl groups which may be used are, for example,
phloroglucinol,
4,6-dimethyl-2,4,6-tri-(4-hydroxyphenyl)-hept-2-ene,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-[4,4-bis-(4-hydroxyphenyl)-cyclohexyl]-propane,
2,4-bis-(4-hydroxyphenyl-isopropyl)-phenol,
tetra-(4-hydroxyphenyl)-methane.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Preferred branching agents are 3,3-bis-(3-methyl-4-hydroxyphenyl)-2-oxo-2,3-dihydroindole and 1,1,1-tri-(4-hydroxyphenyl)-ethane.

The catalysts used in the phase interface synthesis are tertiary amines, such as e.g. triethylamine, tributylamine, trioctylamine, N-ethylpiperidine, N-methylpiperidine and N-i/n-propylpiperidine; preferably triethylamine, tributylamine or N-ethyl-piperidine, which may optionally be employed alongside quaternary ammonium salts, such as tetrabutylammonium/tributylbenzylamonium/tetraethylammonium hydroxide/chloride/bromide/hydrogen sulfate/tetrafluoroborate; as well as the phosphonium compounds corresponding to the ammonium compounds, but a process in which only tertiary amines are used as catalysts is preferred. These compounds are described in the literature, commercially obtainable and familiar to the person skilled in the art.

The catalysts may be added to the synthesis individually, in a mixture or also side by side and successively, optionally also before the phosgenation, but meterings after the introduction of phosgene are preferred, unless an onium compound or mixtures of onium compounds are used as catalysts, in which case an addition of the onium compound before the metering of phosgene is preferred. The catalyst or catalysts may be metered in bulk, in an inert solvent, preferably that of the polycarbonate synthesis, or also as an aqueous solution, and in the case of the tertiary amines then as ammonium salts thereof with acids, preferably mineral acids, in particular hydrochloric acid, and metering as a solution in the organic solvent or solvents of the polycarbonate synthesis is preferred. If several catalysts are used or part amounts of the total amount of catalyst are metered, different methods of metering may of course also be carried out at various places or various times. The total amount of the catalysts used is between 0.001 to 10 mol %, based on the moles of bisphenols employed, preferably 0.01 to 8 mol %, particularly preferably 0.05 to 5 mol %. If the catalyst is metered in bulk, a procedure in which homogeneous thorough mixing of the synthesis mixture with the catalyst is achieved as quickly as possible is preferred, for example, meterings in emulsions with turbulent flow or those by means of dynamic or static mixing elements. In all cases, metering of the catalyst after the phosgenation reactor is preferred, in particular a procedure where the catalyst is added at a place or at a point in time where phosgene is no longer present in the free state, and metering after the metering of the chain terminator, as far as possible after 30 sec to 10 min after the metering of the chain terminator, is particularly preferred.

After introduction of the phosgene, it may be advantageous to mix the organic phase and the aqueous phase thoroughly for a certain time, before, where appropriate, branching agent, if this is not metered together with the bisphenolate, chain terminator and catalyst are added. Such an after-reaction time may be of advantage after each metering. These after-stirring times, if they are included, are between 10 seconds and 60 minutes, preferably between 30 sec and 40 minutes, particularly preferably between 1 and 15 min.

The completely reacted, at least two-phase reaction mixture containing at most still traces (<2 ppm) of chlorocarbonic acid ester, is left to settle for separation of the phases. All or some of the aqueous alkaline phase is possibly passed back into the polycarbonate synthesis as the aqueous phase or fed to the waste water treatment, where solvent and catalyst contents are separated off and recycled. In another variant of the working up, after the organic impurities, in particular solvents and polymer residues, have been separated off and, where appropriate, after a particular pH has been established, e.g. by addition of sodium hydroxide solution, the salt, which may be fed e.g. to chloralkali hydrolysis, is separated off, while the aqueous phase is optionally recycled to the synthesis.

The organic phase containing the polymer is then purified from all contamination of an alkaline, ionic or catalytic nature.

Even after one or more settling operations, optionally assisted by flowing through settling tanks, stirred tanks, coalescers or separators or combinations of these measures—water may optionally be metered into each or some of the separating steps, under certain circumstances using active or passive mixing organs—the organic phase still contains contents of the aqueous alkaline phase in fine droplets and the catalyst, as a rule a tertiary amine.

After this coarse separating off of the alkaline aqueous phase, the organic phase is washed with dilute acids, mineral, carboxylic, hydroxycarboxylic and/or sulfonic acids. Aqueous mineral acids are preferred, in particular hydrochloric acid, phosphorous acid and phosphoric acid or mixtures of these acids. The concentration of these acids should be in the range of 0.001 to 50 wt. %, preferably 0.01 to 5 wt. %.

The organic phase is furthermore washed repeatedly with desalinated or distilled water. The organic phase, optionally dispersed with parts of the aqueous phase, is separated off after the individual washing steps by means of settling tanks, stirred tanks, coalescers or separators or combinations of these measures, it being possible for the wash water to be metered in between the washing steps, optionally using active or passive mixing organs.

Acids, preferably dissolved in the solvent on which the polymer solution is based, may optionally be added between these washing steps or also after the washing. Hydrogen chloride gas and phosphoric acid or phosphorous acid, which may optionally also be employed as mixtures, may preferably be used.

The purified polymer solution thus obtained contains not more than 5 wt. %, preferably less than 1 wt. %, very particularly preferably less than 0.5 wt. % water after the last separating operation.

The polymer may be isolated from the solution by evaporation of the solvent by means of heat, vacuum or a heated entraining gas. Other methods of isolation are crystallization and precipitation.

If the concentration of the polymer solution and possibly also the isolation of the polymer is effected by distilling off the solvent, optionally by superheating and letting down, a "flash process" may be used, see also "Thermische Trennverfahren", VCH Verlagsanstalt 1988, p. 114; if instead of this a heated carrier gas is sprayed together with the solution to be evaporated, a "spray evaporation/spray drying" may e used, described by way of example in Vauck, "Grundoperationen chemischer Verahrenstechnik", Deutscher Verlag für Grundstoffindustrie 2000, 11th edition, p. 690. All these processes are described in the patent literature and in textbooks and are familiar to the person skilled in the art.

On removal of the solvent by heat (distilling off) or the industrially more effective flash process, highly concentrated polymer melts are obtained. In the known flash process, polymer solutions are repeatedly heated under a slightly increased pressure to temperatures above the boiling point under normal pressure, and these solutions, which are superheated in respect of normal pressure, are then let down into a vessel with a lower pressure, e.g. normal pressure. It may be advantageous here not to allow the concentration stages, or in other words the temperature stages of the superheating, to become too large, but rather to choose a two- to four-stage process.

The residues of the solvent may be removed from the highly concentrated polymer melts obtained in this way either directly from the melt with devolatilization extruders (BE-A 866 991, EP-A 0 411 510, U.S. Pat. No. 4,980,105, DE-A 33 32 065), thin film evaporators (EP-A 0 267 025), falling film evaporators or extruder evaporators or by friction compacting (EP-A 0 460 450), optionally also with the addition of an entraining agent, such as nitrogen or carbon dioxide or using vacuum (EP-A 0 039 96, EP-A 0 256 003, U.S. Pat. No. 4,423,207), or alternatively also by subsequent crystallization (DE-A 34 29 960) and heating out of the residues of the solvent in the solid phase (U.S. Pat. No. 3,986,269, DE-A 20 53 876).

Granules may be obtained by direct spinning of the melt and subsequent granulation, or by using melt extruders, from which spinning is carried out in air or under liquid, usually water. If extruders are used, additives may be added to the melt before this extruder, optionally with the use of static mixers or by subsidiary extruders in the extruder.

In the case of spraying, the polymer solution, optionally after heating, is either atomized into a vessel with a reduced pressure, or atomized into a vessel with normal pressure by means of a nozzle with a heated carrier gas, e.g. nitrogen, argon or steam. In both cases, depending on the concentration of the polymer solution, powders (dilute) or flocks (concentrated) of the polymer are obtained, from which, if appropriate, the last residues of the solvent must also be removed as above. Granules may then be obtained by means of a compounding extruder and subsequent spinning. In this case also, additives, as described above, may be added in the peripheral equipment or to the extruder itself. A compacting step for the polymer powder often must be employed before the extrusion due to the low bulk density of the powders and flocks.

The polymer may be precipitated out in substantially crystalline form from the washed and optionally further concentrated solution of the polycarbonate by addition of a non-solvent for polycarbonate. It is advantageous here first to add a small amount of the non-solvent and optionally also to introduce waiting times between the additions of the batches of non-solvent. It may moreover be advantageous to employ various non-solvents. Precipitating agents which are used here are e.g. hydrocarbons, in particular heptane, i-octane and cyclohexane, and alcohols, such as methanol, ethanol and i-propanol.

In the case of precipitation, as a rule the polymer solution is added slowly to a precipitating agent, and agents which are usually used here are alcohols, such as methanol, ethanol or i-propanol, but also cyclohexane or acetone.

The materials obtained in this way are processed to granules and optionally provided with additives as described for the spray evaporation.

According other processes, precipitation and crystallization products or products which have solidified amorphously, in fine-particled form, are crystallized and subjected to further condensation by passing over vapors of one or more non-solvents for polycarbonate, while simultaneously heating at below the glass transition temperature. If the products are oligomers optionally with different end groups (phenolic and chain terminator ends), solid phase condensation is referred to.

The addition of additives serves to prolong the useful life or the color (stabilizers), simplify processing (e.g. mould release agents, flow auxiliaries, antistatics) or adapt the polymer properties to particular stresses (impact modifiers, such as rubbers; flameproofing agents, coloring agents, glass fibres).

These additives may be added individually or in any desired mixtures or several different mixtures to the polymer melt, and in particular directly during the isolation of the polymer or after melting of granules in a so-called compounding step. In this context, the additives or mixtures thereof may be added to the polymer melt as a solid, that is to say as a powder, or as a melt. Another type of metering is the use of masterbatches or mixtures of masterbatches of the additives or additive mixtures.

Suitable additives are described, for example, in "Additives for Plastics Handbook, John Murphy, Elsevier, Oxford 1999" and in "Plastics Additives Handbook, Hans Zweifel, Hanser, Munich 2001".

Suitable antioxidants or heat stabilizers are, for example:
Alkylated monophenols
Alkylthiomethylphenols
Hydroquinones and alkylated hydroquinones
Tocopherols
Hydroxylated thiodiphenyl ethers
Alkylidenebisphenols
O-, N- and S-benzyl compounds
Hydroxybenzylated malonates
Aromatic hydroxybenzyl compounds
Triazine compounds
Acylaminophenols
Esters of β-(3,5-di-tert-butyl-4-hydroxyphenyl)propionic acid
Esters of β-(5-tert-butyl-4-hydroxy-3-methylphenyl)propionic acid
Esters of β-(3,5-dicyclohexyl-4-hydroxyphenyl)propionic acid
Esters of 3,5-di-tert-butyl-4-hydroxyphenylacetic acid
Amides of β-(3,5-di-tert-butyl-4-hydroxyphenyl)propionic acid
Suitable thio synergists
Secondary antioxidants, phosphites and phosphonites
Benzofuranones and indolinones Organic phosphites, phosphonates and phosphanes are preferred, usually those in which the organic radicals consist completely or partly of optionally substituted aromatic radicals.

Processing auxiliaries, such as mold release agents, usually derivatives of long-chain fatty acids, may be added. Pentaerythritol tetrastearate and glycerol monostearate e.g. are preferred. These are employed singly or in a mixture, preferably in an amount of from 0.02 to 1 wt. %, based on the weight of the composition.

Polymer melts produced by isolation of the polymer or by compounding are spun in strand form through a die head and cooled with gas, e.g. air or nitrogen, or cooling liquid, usually water, and the solidified strands are granulated in air, under an inert gas, such as nitrogen or argon, or under water in commercially available granulators with cutters e.g. on a rotating roll. Depending on the design of the apparatus, columnar granules having a circular or elliptical cross-section and a rough or smooth surface are formed by this procedure. The cut edges may be smooth or have a brittle break with broken-open cut edges or residues remaining on the cut edges. Granules which are as uniformly shaped as possible with as few projections as possible remaining on the cut edges are desirable. The dust content in the granules is furthermore to be kept as low as possible, as far as possible below 100 mg/kg of granules. The diameter of the granule particles is preferably between 0.5 mm and 10 mm, more preferably between 1-8 mm, particularly preferably 3-6 mm, while the length of the granule particles is 1-10 mm, preferably between 2-8 mm, and the weight between 10-50 mg, preferably between 15-30 mg. Granules in which the ratio of diameter, in the case of an elliptical cross-section of the average diameter, to the length is 0.8 to 1.2 are preferred, particularly preferably those having a ratio of ~1. These parameters are subject to size distributions, and distributions which are as narrow as possible, that is to say granules having dimensions which are as uniform as possible, are preferred.

The cooling, spinning, granulation and subsequent transportation or the conveying of the granules with gas or liquid and the subsequent storage, optionally after a thorough mixing or homogenization process, are preferably designed such that, in spite of the static charging which possibly exists, as far as possible no impurities, such as, for example, dust, abraded material from the machines, aerosol-like lubricants and other liquids, as well as salts from water-baths or cooling systems possibly used, are applied to the polymer, strand or granule surface.

EXAMPLES

The following experiments were carried out with a circulating pump reactor and two subsequent dwell reactors. The bisphenolate solution, the solvent and the phosgene were metered into the circulating pump reactor and reacted, the first amount of sodium hydroxide solution also was metered into the circulating pump reactor. The second sodium hydroxide solution and the chain terminator solution were metered in before the first dwell reactor. p-tert-Butylphenol was employed as the chain terminator in all the experiments. The catalyst solution was metered in before the second dwell reactor. N-Ethylpiperidine was used as the catalyst in all the experiments.

After the second dwell reactor, the phases were separated and the organic phase washed with approx. 1 wt. % strength hydrochloric acid and 5 times with water. The polycarbonate solution was then concentrated and the melt spun via a devolatilizing extruder and granulated.

| Comparison experiment 1 | | |
| --- | --- | --- |
| Sodium bisphenolate solution (14.87 wt. % BPA) | kg/h | 750 |
| Alkali content of the bisphenolate solution | % OH | 0.12 |
| Solvent (methylene chloride/chlorobenzene = 1:1 wt. %) | kg/h | 661 |
| Phosgene | kg/h | 58.85 |
| First metering of sodium hydroxide solution (32.02 wt. % NaOH) | kg/h | 13.98 |
| Second metering of sodium hydroxide solution (32.02 wt. % NaOH) | kg/h | 48.84 |
| Chain terminator solution (11.47 wt. % in methylene chloride/chlorobenzene = 1:1) | kg/h | 35.2 |
| Catalyst solution; (3.42 wt. % in methylene chloride/chlorobenzene = 1:1 wt. %) | kg/h | 17.71 |
| Temperature of reaction | ° C. | 42 |
| Temperature of catalyst metering | ° C. | 44.3 |
| Ratio of bisphenol to phosgene | | 1.22:1 |

| Comparison experiment 2 | | |
| --- | --- | --- |
| Sodium bisphenolate solution (14.93 wt. % BPA) | kg/h | 750 |
| Alkali content of the bisphenolate solution | % OH | 0.12 |
| Solvent (methylene chloride/chlorobenzene = 1:1 wt. %) | kg/h | 644 |
| Phosgene | kg/h | 56.59 |
| First metering of sodium hydroxide solution (32.08 wt. % NaOH) | kg/h | 9.99 |
| Second metering of sodium hydroxide solution (32.08 wt. % NaOH) | kg/h | 29.12 |
| Chain terminator solution (11.60 wt. % in methylene chloride/chlorobenzene = 1:1) | kg/h | 34.0 |
| Catalyst solution; (2.69 wt. % in methylene chloride/chlorobenzene = 1:1 wt. %) | kg/h | 32.99 |
| Temperature of reaction | ° C. | 42 |
| Temperature of catalyst metering | ° C. | 41.3 |
| Ratio of bisphenol to phosgene | | 1.16:1 |

| Experiment 1, according to the invention | | |
| --- | --- | --- |
| Sodium bisphenolate solution (14.88 wt. % BPA) | kg/h | 750 |
| Alkali content of the bisphenolate solution | % OH | 0.13 |
| Solvent (methylene chloride/chlorobenzene = 1:1 wt. %) | kg/h | 646 |
| Phosgene | kg/h | 56.40 |
| First metering of sodium hydroxide solution (32.02 wt. % NaOH) | kg/h | 9.97 |
| Second metering of sodium hydroxide solution (32.02 wt. % NaOH) | kg/h | 29.27 |
| Chain terminator solution (11.67 wt. % in methylene chloride/chlorobenzene = 1:1) | kg/h | 34.18 |
| Catalyst solution; (2.95 wt. % in methylene chloride/chlorobenzene = 1:1 wt. %) | kg/h | 33.01 |
| Temperature of reaction | ° C. | 35 |
| Temperature of catalyst metering | ° C. | 38.4 |
| Ratio of bisphenol to phosgene | | 1.16:1 |

Result:

| | Content [ppm] of the carbamate according to the general formula (1a) | Moles of bisphenol:moles of phosgene |
| --- | --- | --- |
| Comparison Example 1 | 1,017 | 1:1.22 |
| Comparison Example 2 | 586 | 1:1.16 |
| Example 1 according to the invention | 48 | 1:1.16 |

The experiments clearly show the advantage of the process according to the invention for the preparation of polycarbonates having a low content of compounds of the formula 1a

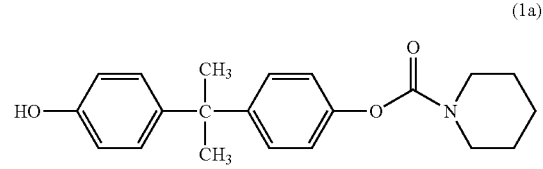

(1a)

Measurement of the Carbamate Content:

0.5 g polycarbonate was dissolved in 20 g THF, 0.19 g 32% strength sodium hydroxide solution and 0.5 g water was added and hydrolysis carried out overnight (about 15 hours), with shaking. After the hydrolysis, the solution was acidified with hydrochloric acid and topped up to 5 ml with THF. 15 μl of the solution were injected into the HPLC system. Detection was with FLD.

Calibration was carried out in accordance with the external standard method (multiple point calibration) using the reference substance from Example A.

Example A

Preparation of 1-(4-tert-butylphenyloxycarbonyloxy)-1'-(piperidinecarboxylic acid) 4,4'-isopropylidenediphenyl ester 9.30 g (0.025 mol) isopropylidenediphenyl bischlorocarbonic acid ester were initially introduced into 150 ml methylene chloride under argon and the mixture cooled to 0° C. 48.49 g (0.428 mol) N-ethylpiperidine were dissolved in 20 ml methylene chloride and the solution added to the bischlorocarbonic acid ester solution at 0° C. 3.76 g (0.025 mol) tert-butylphenol, dissolved in 10 ml methylene chloride, were then added dropwise to this solution at 0° C. The mixture was allowed to warm to room temperature and stirred for 3 hours. Thereafter, the solvent was removed in vacuo. The residue was boiled up in 500 ml toluene and filtered off hot. On cooling, crystals precipitated out in the mother liquor. The mother liquor was filtered and concentrated (95° C., 25 mbar). 13.2 g of a highly viscous red oil were obtained. This was dissolved in 100 ml ethyl acetate and, after addition of 10 g silica gel (silica gel 60; 0.04-0.063 μm; Merck 109385/Lt.: 948 785 203), the solution was concentrated and the concentrate introduced on to a silica gel column (column Ø 5 cm, filling height approx. 25 cm). After chromatography with a solvent mixture of n-hexane/ethyl acetate (9:1), 2.3 g of a vitreous solid were obtained.

$^1$H-NMR (400 MHz, CDCl$_3$) δ=7.4-7.38 (m, 2H), 7.28-7.23 (m, 2H), 7.22-7.13 (m, 6H), 7.03-6.98 (m, 2H), 3.65-3.45 (m, 4H), 1.70-1.55 (m, 6H), 1.66 (s, 6H), 1.32 (s, 9H).

Preparation of piperidinecarboxylic acid 4-[1-(4-hydroxyphenyl)-1-methylethyl]-phenyl ester 0.5 g 1-(4-tert-butylphenyloxycarbonyloxy)-1'-(piperidinecarboxylic acid) 4,4'-isopropylidenediphenyl ester were dissolved in 20 g THF, 0.5 g 32% strength sodium hydroxide solution and 5 g water added and hydrolysis was carried out overnight (about 15 hours), while shaking.

Working Up:

The aqueous phase was separated off from the THF solution and the organic phase concentrated. The residue was taken up in diethyl ether and the mixture was washed several times with water. The organic phase was dried over magnesium sulfate, the drying agent was filtered off and the solvent removed in vacuo. 1.46 g of crude product were obtained and chromatographed on silica gel (silica gel 60; 0.04-0.063 μm; Merck 109385/Lt.: 948 785 203) using a solvent mixture of hexane/ethyl acetate (9:1) (column Ø 5 cm, filling height approx. 25 cm). Hexane/ethyl acetate (5:1) was used as the solvent mixture in the subsequent course. 1.0 g of a white solid was obtained.

$^1$H-NMR (400 MHz, CDCl$_3$) δ=7.20-7.15 (m, 2H), 7.10-7.05 (m, 2H), 7.02-6.95 (m, 2H), 6.75-6.68 (m, 2H), 3.65-3.45 (m, 4H), 1.63 (s, 6H).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. In a phase interface process for preparing aromatic polycarbonate comprising from 0.25 to 180 ppm of one or more carbamates of formula (1)

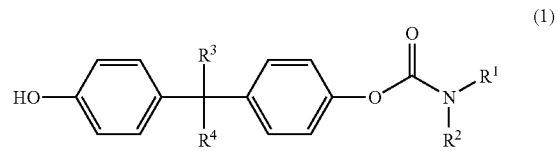

wherein
$R^1$ and $R^2$
are, independently of one another, H or $C_1$ to $C_{12}$ alkyl or together are a $C_4$ to $C_{12}$ alkylidene; and
$R^3$ and $R^4$
are, independently of one another, H, $C_1$ to $C_{12}$ alkyl, or phenyl or together with the carbon atom to which they are bonded are cyclohexyl or trimethylcyclohexyl;
comprising reacting at least one aromatic dihydroxy compound and phosgene in an alkaline medium, the improvement comprising
(i) phosgenating at 0 to 40° C.,
(ii) maintaining the temperature of the reaction mixture at the time of addition of the catalyst at 10 to 40° C., and
(iii) maintaining the molar ratio of aromatic dihydroxy compounds to phosgene at 1:1.05 to 1:1.20.

2. The process of claim 1 which is performed as a continuous process.

3. The process of claim 1 wherein said molar ratio of aromatic dihydroxy compounds to phosgene is maintained at 1:1.08 to 1:1.17.

4. In a phase interface process for preparing aromatic polycarbonate comprising from 0.25 to 180 ppm of one or more carbamates of formula (1)

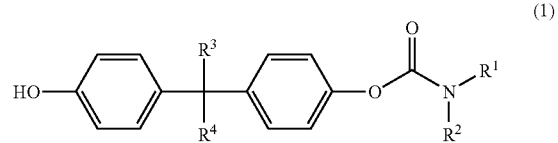

wherein
$R^1$ and $R^2$
are, independently of one another, H or $C_1$ to $C_{12}$ alkyl or together are a $C_4$ to $C_{12}$ alkylidene; and
$R^3$ and $R^4$
are, independently of one another, H, $C_1$ to $C_{12}$ alkyl, or phenyl or together with the carbon atom to which they are bonded are cyclohexyl or trimethylcyclohexyl;
comprising reacting at least one aromatic dihydroxy compound and phosgene in an alkaline medium, the improvement comprising
(i) phosgenating at 0 to 40° C.,
(ii) maintaining the temperature of the reaction mixture at the time of addition of the catalyst at 5 to 36° C., and
(iii) maintaining the molar ratio of aromatic dihydroxy compounds to phosgene at 1:1.05 to 1:1.20.

* * * * *